ELECTRICAL NEURON CIRCUITS

Filed Aug. 28, 1961 3 Sheets-Sheet 1

INVENTOR.
ELLWOOD P. McGROGAN, JR.
BY
[signature]
ATTORNEY

INVENTOR.
ELLWOOD P. McGROGAN, JR.
BY
Morris A. Rabkin
ATTORNEY

INVENTOR.
ELLWOOD P. McGROGAN, JR.
BY Morris A. Rabkin
ATTORNEY

United States Patent Office 3,250,918
Patented May 10, 1966

3,250,918
ELECTRICAL NEURON CIRCUITS

Ellwood P. McGrogan, Jr., West Chester, Pa., assignor to Radio Corporation of America, a corporation of Delaware Filed Aug. 28, 1961, Ser. No. 134,367
16 Claims. (Cl. 307—88.5)

The present invention relates to information processing apparatus, and more particularly to electrical apparatus for recognizing patterns, such as speech patterns, by simulated neural processes.

The invention is especially suitable for providing electrical networks and systems for analyzing patterns, such as the sound patterns which exist in speech, and for logically processing information obtained from such patterns so as to recognize certain speech sounds. The invention is also generally useful for translating information into electrical signals suitable for logical processing, and for logically processing the information represented by such signals.

As of the present time, there are no known electrical systems which are capable of abstracting information and processing such information with the same facility as the biological nervous system. By the biological nervous system is meant the receptor organs, such as the ear and other sense organs, the brain, and the nerve networks interconnecting the receptor organs and the brain. Biological nervous systems have been studied. These studies are discussed in the Handbook of Experimental Psychology, chapter 2, pages 50–93 (John Wiley and Sons, New York, 1950). The basic building blocks of the biological nervous system are neurons which generate electrical impulses by a complex cycle of electrochemical changes. The neurons have two states, active or inactive. The neurons fire, or become active, in response to excitation of greater than a threshold intensity. Neurons also respond to intensity. The number of firings in a given time interval increases as the intensity rises. The number of firings, however, saturates to a maximum number which biological research has found to be around 300 pulses per second. The saturation effect occurs because the electrochemical processes in the nerves, which are believed responsible for the generation of each impulse, require a recuperative period between firings. This recuperative period is called the refractory period.

Attempts have been made to artificially mechanize biological neurons. Circuits have been provided which provide pulses in response to excitation of intensity greater than a given threshold intensity, which have refractory periods between output pulses and which have other properties of biological neurons. Known artificial neurons, for the most part, have not been adapted to perform logical functions, such as determining whether or not different events have taken place, whether one event preceded another, whether the events occurred simultaneously or sequentially, and the like. The input and output characteristics of artificial neurons have made them unsuitable for information processing where a large amount of information is involved. Biological nervous systems are known to be capable of processing a very large amount of information almost simultaneously. Most known artificial neurons are impractical for handling complex information in large quantities without introducing noise and other signal distortions.

Nerve networks of biological nervous systems are believed to logically process information by numerous logical operations having both digital and analog characteristics. It is desirable to perform similar logical operations using circuit neurons. A complex variety of logical functions are also performed by an entire biological nervous system in the abstracting and processing of information. It is also desirable to artificially perform logical functions of similar complexity with systems of circuit neurons and circuit neuron networks.

It is an object of the present invention to provide improved apparatus for mechanizing biological neurons.

It is a still further object of the present invention to provide improved electrical circuit neurons which are adapted to be connected to other similar circuit neurons in complex arrays.

It is a still further object of the present invention to provide improved electrical circuit neurons which more accurately simulate biological neurons than artificial neurons which have been known heretofore.

In accordance with the invention, an improved electrical circuit neuron is provided which involves a system of circuits including an input circuit for combining a plurality of excitatory and inhibitory inputs which occur over a given period of time and a threshold circuit which maintains the neuron quiescently in its inactive state. When the excitatory inputs exceed the inhibitory inputs and a built-in threshold, the neuron becomes active or fires. A pulse generator operated by the threshold circuit translates the amount by which the excitatory inputs exceed the inhibitory inputs and the threshold into an output pulse rate. Corresponding output pulses so provided have excitatory and inhibitory characteristics. The system of circuits also includes a circuit which introduces refractory characteristics in the neuron whereby the output pulse rate varies non-linearly with increasing excitatory stimulation.

Circuit neurons embodying the invention are useful in neural logic networks, neural systems, and in an artificial cochlea which can abstract significant features of human speech in a manner which simulates the operation of the human ear. The invention will be best understood in connection with these utilizations thereof.

The invention itself, both as to its organization and method of operation, as well as additional objects and advantages thereof, will become more readily apparent from a reading of the following description in connection with the accompanying drawings in which.

*Electrical circuit neurons*

Figure 1:
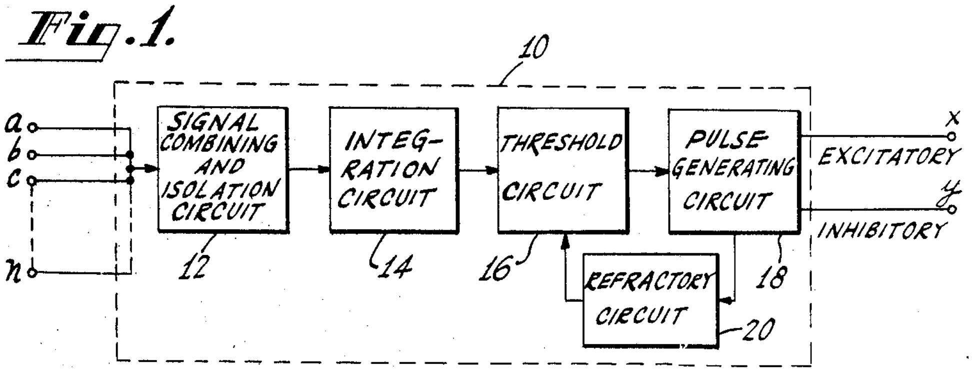
FIG. 1 is a block diagram of an electrical circuit neuron.

Referring more particularly to FIG. 1, there is shown a system of circuits which provides an electrical circuit neuron 10. A plurality of inputs *a* to *n*, which may be inhibitory or excitatory, are applied to a signal combining and isolation circuit 12. These inputs may be pulse trains or analog signals. This circuit has a low input impedance and a high output impedance and effectively isolates the inputs from the remainder of the circuits of the neuron 10. The combined outputs are applied to an integration circuit 14 having a sufficiently long time constant to accumulate inputs which occur over a finite time.

The integration circuit provides temporal properties (response to input signals which occur over a finite period of time) in the neuron 10.

The output of the integration circuit 14 is applied to a threshold circuit 16 which fires when the integrated sum of the inputs exceeds a certain threshold level. This threshold level is denoted by the symbol $\theta$. When the threshold circuit fires, it operates a pulse generating circuit 18 to generate a pulse. By "firing" or "fires" is meant that the state of the circuit is changed from its inactive quiescent state to its active state so as to provide an output signal. The pulse generating circuit 18 provides an excitatory pulse on its $x$ output, and an inhibitory pulse on its $y$ output. The pulse generating circuit 18 has a low output impedance which permits it to be coupled to other circuit neurons without additional impedance matching circuits. The excitatory and inhibitory pulses are bi-polar and complementary. Thus, the excitatory pulses may be positive voltage pulses and the inhibitory pulses may be negative voltage pulses. The excitatory and inhibitory pulses are of equal amplitude so as to facilitate equal strength excitation and inhibition of other neurons.

The pulse generating circuit and the threshold circuit are also interconnected by a "refractory" circuit 20 which prevents the threshold circuit from firing the pulse generating circuit while a pulse is being generated and for a predetermined period thereafter. The refractory circuit also provides a non-linear analog response from the circuit neurons such that the output pulse rate, both excitatory and inhibitory, will depend upon the extent to which the input signal magnitude exceeds the threshold for neuron firing.

Figure 2:
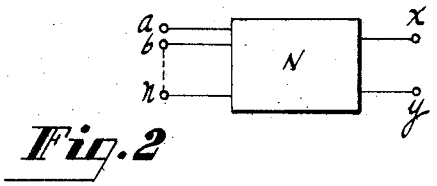
FIG. 2 is a block diagram used hereinafter to symbolize an electrical circuit neuron of the type illustrated in FIG. 1.

A symbol for the electrical circuit neuron which is used in the drawing is shown in FIG. 2. This symbol is a rectangular block inscribed with the letter N. A plurality of inputs $a$ to $n$, inclusive, may be applied to the neuron. The excitatory output is labeled with the letter $x$ and the inhibitory output is labeled with the letter $y$.

Figure 3:
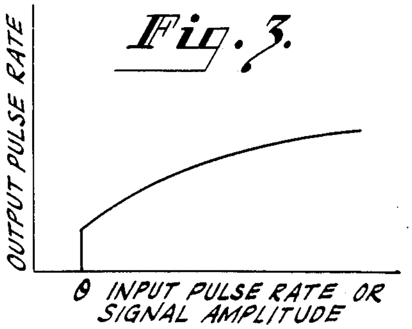
FIGS. 3 to 5 are curves showing different input-output characteristics obtainable with the electrical circuit neuron shown in FIG. 1.

The normal input-output characteristic of the circuit neuron 10 is shown in FIG. 3. The abscissa of the curve is calibrated in terms of either the input pulse rate or signal amplitude for excitatory (positive) signals, as the case may be. The ordinate is calibrated in terms of the pulse rate of the pulse train obtainable either at the excitatory or at the inhibitory output. The neuron does not fire or generate an output pulse until the threshold $\theta$ is reached. After the threshold is exceeded, the output pulse rate increases as a non-linear function of the input pulse rate or signal amplitude and depends upon how much the input pulse rate or signal amplitude exceeds the threshold. The output pulse rate saturates at a maximum pulse rate which is established by the refractory circuit 20. The curve of FIG. 3 illustrates that the neuron 10 has analog and digital properties. The digital properties are that the neuron is either firing or nonfiring and depends upon the inputs exceeding or not exceeding the threshold. The analog property is the output pulse rate or the rate at which the neuron fires.

Figure 4:
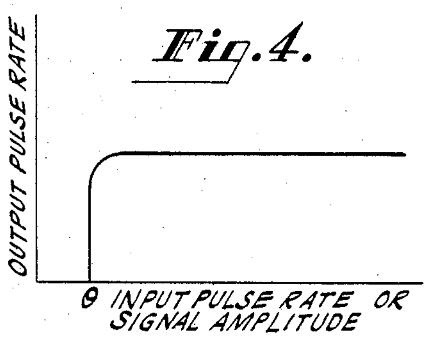
Figure 5:
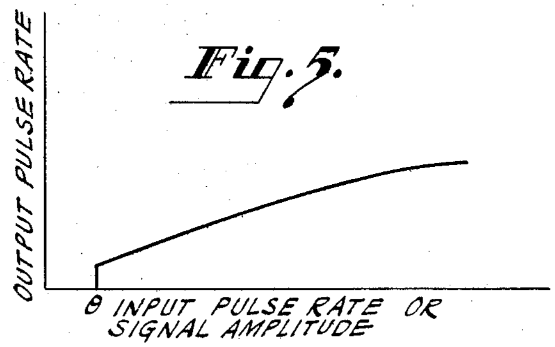

The input-output characteristic shown in FIG. 4 is obtainable by excitatory feedback; that is, as soon as the threshold is exceeded above a certain threshold $\theta$, sufficient excitation is fed back to the input circuit to maintain the input to the circuit above $\theta$. FIG. 5 shows input-output characteristics obtainable by inhibitory feedback. Saturation in the output pulse rate requires a greater input pulse rate, for example, when inhibitory feedback is used.

The circuit neuron 10 has (1) summation of inputs, (2) short term memory or temporal characteristics, (3) built-in threshold, (4) output pulses, and (5) refractoriness, which biological research has shown to be inherent in biological neurons. The circuit neuron of FIG. 10, however, also has characteristics which make it practical for use in complex neural networks and neural systems. These characteristics are (1) low input and output impedances, (2) integration circuits isolated from the input connections so that the integration time constant is independent of the impedance of the input connections, (3) equal excitatory and inhibitory capabilities, (4) complementary, bipolar outputs, and (5) controllable refractoriness for obtaining a desired input-output characteristic. These characteristics will be more clearly understood from a discussion of the circuits of neurons of the type shown in FIG. 1 which follows.

Figure 6:
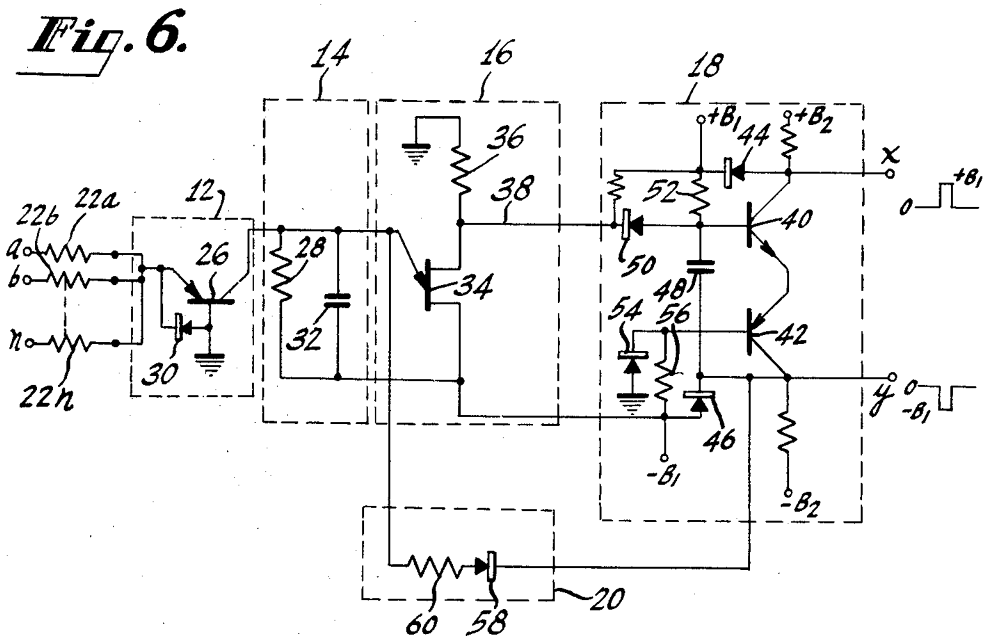
FIG. 6 is a schematic diagram of a neuron of the type shown in FIG. 1.

In the circuit neuron shown in FIG. 6, the input signals $a$ to $n$ are applied through resistors 22a–22n, inclusive, to the signal combining and isolating circuit 12. These resistors may be of different values of resistance for signal weighting purposes. Signal weighting plays a prominent part in many of the neural networks to be described hereinafter. The signal combining and isolating circuit is a common base transistor amplifier using a P-N-P transistor 26. The collector of the transistor 26 is reverse biased by voltage which is applied thereto from a source of operating potential $-B_1$ which is connected to the collector through a resistor 28 in the threshold circuit 16. Since the collector is reverse biased, the common base amplifier has a relatively high output impedance, for example 500 kilohms. The input impedance of the common base amplifier is relatively low and may, for example, be less than 100 ohms. A diode 30 is connected between the base and the emitter of the transistor 26 to prevent the input impedance from becoming high should the net input current go negative and to protect the transistor against high magnitude reverse currents which might cause emitter to base breakdown. The current gain of the transistor amplifier in the circuit 12 is approximately unity. Accordingly, a signal corresponding to the sum of the input signal currents flows out of collector of the transistor 26. Since the input impedance of the common base amplifier including the transistor 26 is very low as compared to the resistance of the weighting resistors, a large number of inputs may be connected to the circuit 12 without significantly affecting the accuracy of the summation. Since the signals are summed across the low input impedance of the circuit 12, the sum of the inputs will be in the same regardless of the number of inputs and will depend only upon the magnitude of the signals applied at the inputs.

The integration circuit 14 includes the resistor 28 and a capacitor 32. The time constant of this circuit is independent of the resistance of the input connections, since the common base amplifier of the circuit 12 has a high output impedance.

The threshold circuit 16 includes a unijunction transistor 34 which has its input electrode connected to the integration circuit 16 output. For a description of unijunction transistors, reference may be had to General Electric Transistor Manual, Fifth Edition (General Electric Co., Liverpool, N.Y., 1960), section 13, pp. 138, et seq. The threshold level $\theta$ of the unijunction transistor is set by the source of operating voltage $-B_1$. The characteristics of a unijunction transistor are that its output impedance is high until a voltage exceeding the threshold level is applied to its control electrode. Then, the output impedance measured between the output electrodes of the transistor 34 drops, for example from 15 kilohms to 5 kilohms. Accordingly, a negative going pulse appears at the output 38 of the unijunction transistor 34 when the signal at the control electrode of the transistor 34 exceeds the threshold level.

The pulse generating circuit 18 includes complementary transistors 40 and 42 which, respectively, are of N-P-N and P-N-P types. The collector to emitter junctions of the transistors 40 and 42 are in series between sources of operating voltage $+B_2$ and $-B_2$. The transistors 40 and 42 are, respectively, biased to saturation in their quiescent state by the source of operating voltages $+B_1$ and $-B_1$. Quiescently, the outputs $x$ and $y$ are at approximately zero volts, since both transistors 40 and 42 are saturated and their collectors are connected to sources of operating voltage $+B_2$ and $-B_2$ of opposite and approximately equal value which are substantially balanced with respect to each other.

When a negative triggering pulse appears at the output 38 of the threshold circuit 16, the N-P-N transistor 40 is cut off and, in turn, cuts off the transistor 42. The $x$ output goes positive and is clamped to a positive voltage equal to the voltage of the source $B_1$ by a clamping diode 44 connected by the $x$ output and the source of operating voltage $+B_1$. The $y$ output similarly goes negative and is clamped to the voltage equal to the source $-B_1$ voltage by a clamping diode 46, which is connected between the $y$ output and the source $-B_1$. Accordingly, the output voltage in the $x$ and the $y$ outputs of the pulse generators will be bi-polar and complementary. The negative output from the collector of the transistor 42 is coupled to the base of the other transistor 40 through a capacitor 48. This capacitor 48 prevents the base of the transistor 40 from becoming positive under the influence of the voltage from the source of operating potential $+B_1$ for a given period of time determined by the time constant of the circuit associated with capacitor 48. At the end of this given period of time, the transistors 40 and 42 return to their saturated quiescent states.

A diode 50 decouples the threshold circuit 16 from the pulse generating circuit 18 for the duration of the output pulse from the pulse generating circuit, since it is reverse biased by the negative voltage transmitted through the coupling capacitor 48 while the output pulse persists. This diode 50 is normally forward biased from the source of operating potential $+B_1$ through a resistor 52. Another diode 54 is connected to the base of the transistor 42. This diode is forward biased from the source of operating voltage $-B_1$ through a resistor 56. This forward biased diode 54 compensates for the voltage drop from collector to base of the transistor 42 during quiescent operation and makes the $y$ output of the pulse generating circuit 18 almost zero volts rather than a few tenths of a volt positive.

The pulse generating circuit 18 is a monostable multivibrator or one-shot circuit since it generates a single pulse for each triggering pulse. The pulse generating circuit is also generally useful as a pulse amplifier. The coupling capacitor 48 may be eliminated and pulses may be applied to the base of the transistor 40. The circuit will then provide bipolar output pulses in response to negative input pulses. A pulse amplifier circuit, such as shown in FIG. 6, may be used in digital circuits in those cases where signals representing a bit and its complement are desired.

The refractory circuit 20 prevents the neuron from firing for the duration of the output pulse. This refractory circuit includes a diode 58 and a resistor 60 connected between the negative, $y$ output of the pulse generating circuit 18 and the control electrode of the unijunction transistor 34. When the neuron fires, the negative output pulse will be transmitted by the diode 58 and hold the control electrode at a negative level for the duration of the output pulse. The refractory circuit 20 prevents the integrating circuit 14 from charging to a level which would cause the threshold circuit 16 to fire. Accordingly, the firing rate of the threshold circuit 16 cannot be greater than the firing rate of the pulse generating circuit 18. The refractory circuit thereby insures that the output pulse rate and the threshold circuit 16 firing rate correspond.

When the unijunction transistor 34 fires, the impedance between the control electrode and the lower one of the output electrodes (the one connected to the capacitor 32) drops to a very low value. Accordingly, the capacitor 32 discharges when the threshold circuit 16 fires. The period of time for the integration circuit 14 to charge to the threshold potential after discharging is a function of the amplitude of the input signals or the input pulse rate. Thus, the output pulse rate of the neuron is a measure of how much the input signal amplitude or input pulse rate exceeds the threshold. This is a nonlinear function, as shown in FIGS. 3 to 5, because of the non-linear rate of charging of the integration circuit 14.

Figure 8:
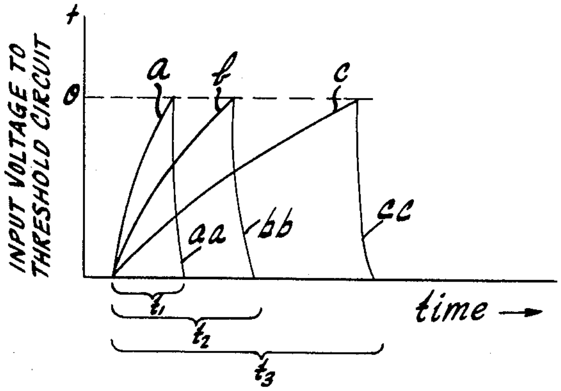
FIG. 8 is a family of curves which illustrate the input characteristics of the neuron circuit shown in FIGS. 7 and 8.

FIG. 8 illustrates the relationship between the time of charging of the integration circuit 14 and the amplitude of the input signal applied thereto. Curve "$a$" represents a short charging time $t_1$ when a large amplitude input signal is applied to the integration circuit. Curves "$b$" and "$c$" represent input signals of successively lower magnitude. When the threshold is reached, the integrating circuit discharges rapidly as shown by the steep descending portions *aa*, *bb*, *cc*, respectively, of each of the curves *a*, *b*, and *c*. A neuron having a threshold circuit which is discharged upon charging to the threshold level is especially suitable for use in receptor neurons which respond to analog signals. Such signals may be derived in response to any event to be analyzed such as a tone, a speech pattern, light pattern, or the like. Since the integration circuit discharges rapidly when the analog input signal reaches threshold level, the integration circuit can charge again to the new level of the input signal and thereby accurately follow variations in the level of the analog signal.

Other neurons, termed logic or pulse neurons, are especially suitable for logically processing information which may be in the form of pulse trains from other neurons, such as other receptor neurons. In such logic neurons it is desirable to provide continuous firing so long as the input signal pulse rate or amplitude is above the threshold. A circuit for a logic neuron will be described hereinafter in connection with FIG. 9 of the drawing.

Figure 7:
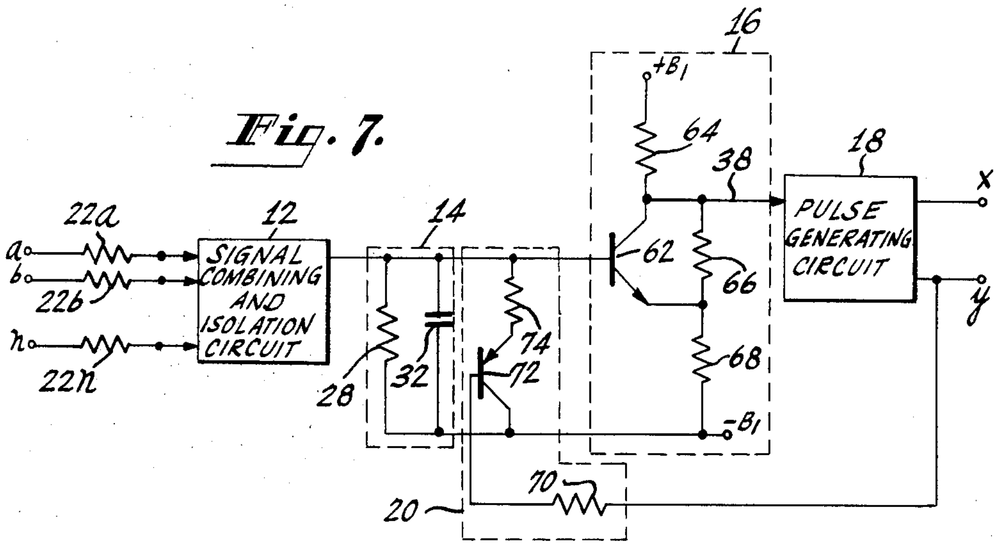
FIG. 7 is a partially schematic, partially block diagram of another neuron of the type shown in FIG. 1.

Another neuron circuit is shown in FIG. 7. This circuit may have a plurality of inputs *a* to *n* which are connected thereto through weighting resistors **22*a* to 22*n*. Where circuits and components of FIG. 7 are similar to the circuit and component in FIG. 6, like reference numerals are used in FIG. 7. A signal combining and isolation circuit 12** similar to the one shown in FIG. 6 responds to the inputs *a* to *n*. This circuit 12 is connected to integration circuit 14 including a resistor 28 and a capacitor 32. The threshold circuit 16 includes an N-P-N transistor 62. This transistor is normally biased to cutoff by a source of operating voltage $-B_1$. The threshold level of the transistor 62 is set by a voltage divider including three resistors 64, 66 and 68 which are connected in series between the sources of operating voltage $+B_1$ and $-B_1$. The emitter voltage established by this voltage divider determines the threshold of the circuit 16. The output 38 of the threshold circuit 16 is a negative pulse generated when the transistor 62 is turned on in response to a positive base voltage greater than the threshold level. This negative pulse triggers the pulse generating circuit 18. The $y$ output is connected to the refractory circuit 20, including a resistor 70 which connects the $y$ output to the base of a P-N-P transistor 72. The emitter to collector path of this transistor 72 is connected through a resistor 74 across the capacitor 32 in the integrating circuit 14. The transistor 72 is normally non-conductive, since the base is quiescently at zero volts. Upon firing of the neuron, a negative pulse is applied to the base of the transistor 72. The transistor 72 conducts heavily thereby discharging the capacitor 32. Accordingly, the refractory circuit prevents the integrating circuit from charging to threshold potential for the duration of an output pulse from the neuron. The impedance presented by the transistor 72 may be varied by varying the valve of the resistor 74. Accordingly, the integrating circuit may be discharged by varying amounts, depending upon the value of that resistor 74. The characteristics of the neuron shown in FIG. 7 are similar to the characteristics of the neuron shown in FIG. 6. However, the circuit of FIG. 7 is somewhat less expensive, since it permits the use of two presently relatively inexpensive transistors of the usual type instead of a presently relatively expensive unijunction transistor.

Figures 9, 10:
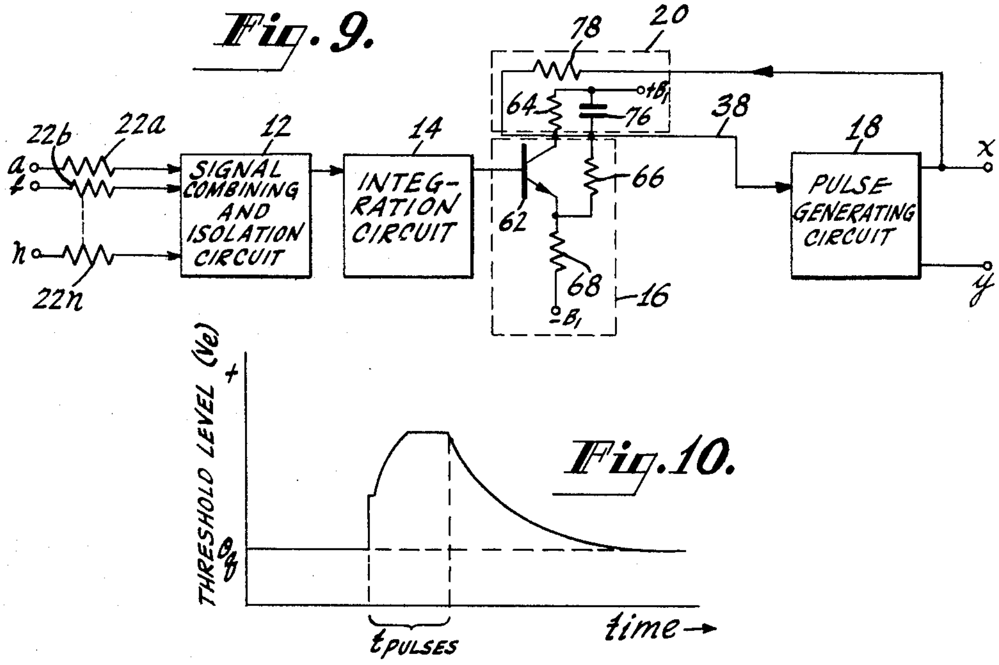
FIG. 9 is a partially block, partially schematic diagram of still another neuron of the type shown in FIG. 1.
FIG. 10 illustrates a waveform which occurs during operation of the circuit shown in FIG. 9.

Referring to FIG. 9 there is shown another circuit neuron. Parts of the neuron of FIG. 9 which are similar to parts of the neuron of FIG. 6 are designated by like reference numerals. The neuron of FIG 9 may have a number of inputs *a* to *n* which are connected to a signal combining and isolating circuit 12 through weighting resistors 22*a* to 22*n*. The combined signals are applied to an integrating circuit 14 and thence to a threshold circuit 16. The threshold circuit 16 of FIG. 9 is similar to the threshold circuit of FIG. 7 in that it includes an N-P-N transistor 62 and a threshold setting voltage divider including resistors 64, 66, and 68. This circuit establishes a quiescent threshold $\theta_q$ at the emitter. The output 38 of the threshold circuit 16 triggers a pulse generating circuit 18. The positive output ($x$) of the pulse generating circuit is fed back through the refractory circuit 20 to the threshold circuit 16. This circuit includes a capacitor 76 which is connected across one of the voltage divider resistors 64 and a resistor 66 which is connected between the collector of the transistor 62 and the resistor 68.

When the neuron fires, the transistor 62 conducts heavily and the current through the emitter resistor 68 of the voltage divider increases. The voltage $V_e$ at the emitter of the transistor 62 increases (see FIG. 10). After a short interval (illustrated by the step in FIG. 10), the pulse generating circuit generates a pulse which is fed back through the resistors 78 and 64 and the collector to emitter path of the transistor to the emitter resistor 64. The voltage at the emitter thereby again increases. The fed back output pulse and the increased voltage across the resistor 68 due to conduction through the transistor 62 add together and raise the threshold level of the threshold circuit 16 for the duration of the positive output pulse. The duration of the pulse is labeled in FIG. 10 as *t* pulses. A positive voltage appears at the terminal of the capacitor 76 which is connected to the collector of the transistor 62. The capacitor charges to this positive voltage. After the end of the output pulse, the capacitor discharges. The trailing edge of the curve in FIG. 10 results from the discharge of the capacitor. The voltage across the capacitor also appears at the emitter of the transistor 62 and causes the threshold to be raised above the threshold $\phi_q$ for a period of time after the pulse subsides. This period of time can be adjusted by adjusting the value of the capacitor 76 and/or of the resistors connected thereto.

Since the integrating circuit 14 is not discharged, the transistor 62 in the threshold circuit 16 will continue to fire, if the signal level in the output of the integrating circuit remains above the threshold $\theta_q$. However, since the threshold level is raised after each firing and returns to its original value $\theta_q$ slowly over a period of time, the intervals between successive firings will depend upon how much the input signal exceeds the threshold $\theta_q$. For example, if the input signal amplitude is slightly greater than the threshold amplitude $\theta_q$ the output will be a single pulse since the threshold circuit will not fire again until the capacitor discharges almost entirely. When the input signal amplitude is increased, a second pulse will follow the first pulse before the threshold returns to $\theta_q$ (before the capacitor 76 discharges). If the input signal amplitude is still higher, the threshold will still be exceeded immediately after the termination of the first output pulse. Accordingly, the output pulses will be still closer together. The pulse rate is, therefore, a function of the extent by which the input signal amplitude exceeds the threshold $\theta_q$.

Pulses will be generated so long as the input signal exceeds the threshold $\theta_q$. The rate at which these pulses are generated depends upon how much the threshold is exceeded. The pulses will stop as soon as the input signal amplitude drops below the threshold. The non-linear input-output characteristics illustrated in FIGS. 3 to 5 are therefore obtained with the logic neuron shown in FIG. 9.

What is claimed is:

1. A neuron circuit which comprises input means for summing a plurality of excitatory and inhibitory input signals of opposite polarity, and circuit means coupled to said input means for responding to the sum of said excitatory and inhibitory signals occurring during a given period of time, when said sum exceeds a certain threshold, to provide a plurality of output pulses of opposite polarity and having a rate depending upon the difference between said sum and said threshold, said rate increasing non-linearly with said difference and saturating at a maximum rate.

2. A neuron circuit responsive to excitatory and inhibitory input signals of opposite polarity, which circuit comprises input means for deriving the sum of those of said input signals which occur during a given period of time, and circuit means coupled to said input means for providing a plurality of pairs of complementary output pulses of opposite polarity when said sum exceeds a given threshold, one pulse of each of said pairs of output pulses having excitatory characteristics and the other pulse of each of said pairs of output pulses having inhibitory characteristics.

3. A neuron circuit responsive to excitatory and inhibitory input signals of opposite polarity, which circuit comprises input means for deriving the sum of those of said input signals which occur during a given period of time, and means coupled to said input means for providing a pair of trains of output pulses when said sum exceeds a given threshold, said pulses in each of said trains having a repetition rate depending upon the difference between said sum and said threshold, the pulses in one of said trains being opposite in polarity and complementary to the pulses in the other train of said pair whereby the pulses in said one train have excitatory characteristics and the pulses in said other train have inhibitory characteristics.

4. A neuron circuit responsive to excitatory and inhibitory input signals of opposite polarity, which circuit comprises input means for deriving the sum of those of said input signals which occur during a given period of time, pulse generating means for providing a plurality of pairs of excitatory and inhibitory output pulses when said sum exceeds a given threshold, and means coupled to said pulse generating means for feeding back to said input means one of said excitatory and said inhibitory output pulses to change the sum derived by said input means.

5. A neuron circuit responsive to excitatory and inhibitory input signals of opposite polarity, which circuit comprises input means for deriving the sum of those of said input signals which occur during a given period of time, and pulse generating means coupled to said input means for providing a pair of trains of output pulses when said sum exceeds a given threshold, the pulses in each said trains having a repetition rate depending upon the difference between said sum and said threshold, the pulses in one of said pair of trains being opposite in polarity and complementary to the pulses in the other train of said pair whereby the pulses in said one train have excitatory characteristics and the pulses in said other train have inhibitory characteristics, and means coupled to said pulse generating means for responding to the pulses of at least one of said pair of trains for controlling the repetition rate of the pulses provided by said pulse generating means.

6. A neuron circuit adapted to be stimulated by an excitatory signal, which circuit comprises a threshold circuit having an active state and an inactive state, and adapted to be fired from its inactive state to its active state in response to input signals exceeding a given threshold, level, a pulse generating circuit coupled to said threshold circuit to generate an output pulse when said threshold circuit is in its active state, and means for varying the rate of generation of pulses by said pulse generating circuit including a direct current conductive refractory circuit connecting said pulse generating circuit and said threshold circuit in feed-back relationship.

7. A neuron circuit responsive to excitatory and inhibitory input signals which comprises a threshold circuit having a normally inactive state and conditionable into an active state in response to said excitatory input signals which exceed a certain threshold, a pulse generating circuit coupled to said threshold circuit to generate pairs of output pulses when said threshold circuit is conditioned into its active state, one of each pair of output pulses being excitatory and the other inhibitory, and a direct current conductive refractory circuit coupled to said pulse generating circuit for feeding back one of said excitatory and inhibitory output pulses of each of said pairs of pulses to said threshold circuit for varying the threshold thereof.

8. A neuron circuit responsive to a plurality of input signals comprising in combination a common base transistor amplifier for linearly combining all of said input signals, said amplifier including a transistor having an emitter, a base, and a collector, means for biasing said amplifier to provide a low input impedance between said emitter and said base, and a high output impedance between said collector and said base, means for applying said input signals between said emitter and said base, an integrating circuit having a substantially invariable time constant connected between said collector and said base to integrate said combined input signals, a normally inactive threshold circuit coupled to said integrating circuit to be activated when said integrated combined input signals exceed a certain threshold level, a pulse generating circuit coupled to said threshold circuit for providing output pulses when said threshold circuit is activated and a refractory circuit for feeding back said output pulses from said pulse generator into said integrating circuit.

9. A neuron circuit responsive to excitatory and inhibitory input signals, which circuit comprises an integrating circuit having a substantially invariable time constant, a signal combining and isolating circuit having an input for receiving said excitatory and said inhibitory signals and an output connected to said integrating circuit, a threshold circuit including a unijunction transistor having an input electrode and a pair of output electrodes, said integrating circuit being connected between said input electrode and one of said pair of output electrodes, means for biasing said transistor into its non-conductive state, a pulse generating circuit connected to the other of said pair of output electrodes for providing an output pulse when said threshold circuit is conditioned into its conductive state, and a refractory circuit coupled from said pulse generating circuit to said unijunction transistor input electrode for applying inhibitory output pulses to said unijunction transistor input electrode to maintain said transistor in its conductive state for the duration of said output pulse.

10. A neuron circuit responsive to excitatory and inhibitory input signals which comprises an integrating circuit having a substantially invariable time constant for deriving the sum of said input signals which occur over a given period of time, signal combining and isolating circuit means coupled to apply said input signals to said integrating circuit, a threshold circuit coupled to said integrating circuit, said threshold circuit including an amplifier means for biasing said amplifier to cut-off except in the presence of input signals thereto exceeding a predetermined threshold, a pulse generating circuit coupled to be operated by said threshold circuit and connected to said amplifier for providing an output pulse when said amplifier is conductive, and refractory circuit means including a transistor having an emitter, a base, and a collector means, connecting the emitter and collector of said transistor across said integrating circuit, said refractory circuit means also including a feed back circuit connected between said pulse generating circuit and the base of said transistor for applying output pulses to said base to render said transistor conductive from its emitter to collector whereby to discharge said integrating circuit for the duration of said output pulse.

11. A neuron circuit responsive to excitatory and inhibitory input signals, said circuit comprising an integration circuit for deriving the sum of said input signals, a signal combining and isolating circuit for applying said input signals to said integration circuit, a threshold circuit including an amplifier normally biased to cut-off, said integration circuit being connected to the input of said amplifier for driving said amplifier into its conductive state when said sum exceeds a given threshold, a pulse generating circuit operated by said threshold circuit for providing output pulses when said amplifier conducts, and a refractory circuit including a charging circuit for applying said output pulses to said amplifier for changing the bias on said amplifier and thereby the threshold level thereof for a given period of time after the occurrence of each said output pulses.

12. A circuit for processing information represented by a plurality of input signals, which circuit comprises summing means for linearly combining said input signals, an integrating circuit having a substantially invariable time constant coupled to said summing means for integrating said combined input signals, a normally inactive threshold circuit coupled to said integrating circuit to be activated when said integrated combined input signals exceed a predetermined threshold, pulse generating means coupled to said threshold circuit for generating output pulses when said threshold circuit is activated, and a refractory circuit coupled to said pulse generating means for feeding back output pulses to said threshold circuit for inhibiting said threshold circuit from being activated while each of said output pulses is being generated.

13. A pulse generator comprising in combination first and second complementary transistors, each having a base, an emitter and a collector, means for serially connecting said transistors by coupling the emitters of said transistors together, means for applying a first energizing signal of one polarity to the collector of said first transistor and a second energizing signal of the opposite polarity to the collector of said second transistor, said first and second energizing signals having amplitudes of substantially the same absolute magnitudes, first and second means coupled to the bases of said first and second transistors, respectively, for biasing said transistors to conduct in saturation, first and second output terminals coupled to the collectors of said first and second transistors, respectively, said output terminals exhibiting substantially zero potential when said first and second transistors are saturated, and means for applying a reverse biasing pulse to the base of one of said transistors to cut off both of said serially connected transistors during the duration of said pulse whereby said first and second output terminals provide substantially equal but opposite output pulses having magnitudes substantially equal to the magnitude of said first and second energizing signals.

14. A neuron circuit responsive to excitatory and inhibitory input signals of opposite polarity, comprising in combination, a summing circuit for deriving the sum of said input signals, an integrating circuit exhibiting a predetermined time constant for integrating said sum signals,
isolating means for coupling said integrating circuit to said summing circuit to maintain said time constant substantially invariable,
means coupled to said integrating circuit for providing a pair of output pulses of opposite polarity when said integrated sum signals exceed a given threshold, and
means responsive to at least one of said output pulses for controlling said output pulse providing means.

15. A neuron circuit responsive to a plurality of input signals, comprising in combination,
a summing circuit for deriving the sum of said input signals,
an integrating circuit having a predetermined time constant for integrating said sum signals to provide an integrated signal,
isolating means for coupling said integrating circuit to said summing circuit to maintain said time constant substantially invariable,
a threshold circuit coupled to said integrating circuit and having a normally inactive state and conditionable to an active state when said integrated signal exceeds a certain threshold level,
a pulse generating circuit coupled to said threshold circuit for providing output pulses when said threshold circuit is conditioned into its active state by said integrated signal, and
a refractory circuit for feeding back said output pulses said pulse generating circuit into said integrating circuit.

16. A neuron circuit responsive to excitatory and inhibitory input signals, comprising in combination,
input means for summing a plurality of said input signals, an integrating circuit exhibiting a predetermined time constant for integrating said sum signals,
isolating means for coupling said integrating circuit to said summing circuit to maintain said time constant substantially invariable, and
circuit means coupled to said integrating circuit for producing an output signal when said excitatory input signals exceed said inhibitory input signals by a predetermined threshold amount,
said output signal having a characteristic depending upon the difference between said integrated sum signal and said threshold.

References Cited by the Examiner

UNITED STATES PATENTS

| | | | |
|---|---|---|---|
| 2,853,632 | 9/1958 | Gray | 307—88.5 |
| 2,905,931 | 9/1959 | Lubkin | 340—172.5 |
| 3,016,466 | 1/1962 | Richards | 307—88.5 |
| 3,064,240 | 11/1962 | Kalfaian | 340—172.5 |

OTHER REFERENCES

"Artificial Neuron," in Science, vol. 129, Apr. 10, 1959; pp. 962–963.

"Design of a Solid-State Neuron Circuit for Use in Self-Organizing Systems," in Digest of Technical Papers, 1960 Internationl Solid-Stage Circuits Conference, by Coates and Fisch, pp. 38–39, and Fig. 2 relied on, Feb. 11, 1960.

"Report On Bionics," Electronic Neurons in Electronic Design, Sept. 14, 1960, p. 40 relied upon.

ARTHUR GAUSS, *Primary Examiner.*

MALCOLM MORRISON, *Examiner.*

P. J. HENON, S. D. MILLER, *Assistant Examiners.*